(12) United States Patent
Wang

(10) Patent No.: US 11,768,555 B2
(45) Date of Patent: Sep. 26, 2023

(54) TOUCH CONTROL SCREEN AND ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventor: Guochao Wang, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 291 days.

(21) Appl. No.: 17/261,512

(22) PCT Filed: Oct. 16, 2020

(86) PCT No.: PCT/CN2020/121473
§ 371 (c)(1),
(2) Date: Jan. 19, 2021

(87) PCT Pub. No.: WO2022/041414
PCT Pub. Date: Mar. 3, 2022

(65) Prior Publication Data
US 2022/0197464 A1   Jun. 23, 2022

(30) Foreign Application Priority Data
Aug. 31, 2020  (CN) .......................... 202010894338.1

(51) Int. Cl.
*G06F 3/041* (2006.01)

(52) U.S. Cl.
CPC ........ *G06F 3/04164* (2019.05); *G06F 3/0412* (2013.01)

(58) Field of Classification Search
None
See application file for complete search history.

(56) References Cited

U.S. PATENT DOCUMENTS

2016/0253538 A1   9/2016  Lu et al.
2018/0308903 A1*  10/2018 Jeong ................. H01L 27/3276

FOREIGN PATENT DOCUMENTS

| CN | 105867676 A | 8/2016 |
| CN | 109002222 A | 12/2018 |
| CN | 209356818 U | 9/2019 |
| CN | 110489012 A | 11/2019 |
| CN | 110515493 A | 11/2019 |
| CN | 110837314 A | 2/2020 |
| CN | 110967857 A | 4/2020 |
| CN | 111158518 A | 5/2020 |

(Continued)

*Primary Examiner* — Brian M Butcher
(74) *Attorney, Agent, or Firm* — The Roy Gross Law Firm, LLC; Roy Gross

(57) ABSTRACT

A touch control screen and an electronic device are disclosed. The touch control screen includes: a plurality of touch control units disposed at intervals, wherein, a material of the touch control units is a transparent conductive material; and a plurality of touch control lead wires corresponding to and connected to the touch control units, wherein, at least one of the touch control units covers at least a part of a multiplexed functional area.

16 Claims, 3 Drawing Sheets

(56) References Cited

FOREIGN PATENT DOCUMENTS

| CN | 111261688 A | 6/2020 |
| CN | 111273822 A | 6/2020 |
| CN | 111381700 A | 7/2020 |
| CN | 111509011 A | 8/2020 |
| CN | 111584571 A | 8/2020 |

\* cited by examiner

TOUCH CONTROL SCREEN AND ELECTRONIC DEVICE

CROSS REFERENCE TO RELATED APPLICATIONS

This application is a National Phase of PCT Patent Application No. PCT/CN2020/121473 having International filing date of Oct. 16, 2020, which claims the benefit of priority of Chinese Application No. 202010894338.1 filed Aug. 31, 2020. The contents of the above applications are all incorporated by reference as if fully set forth herein in their entirety.

FIELD OF INVENTION

The present disclosure relates to the field of display technologies, and more particularly, to a touch control screen and an electronic device.

BACKGROUND OF INVENTION

Under-screen optical sensor technology directly disposes optical sensors under screens, which allows panels to achieve complete display of full screen and ensures normal operation of the optical sensors below by special panel designs.

Current display panels having under-screen camera technology include a multiplexed functional area and a display area, and a through-hole is usually defined on a touch control screen corresponding to the multiplexed functional area. The multiplexed functional area does not display pictures when a camera is used, and the multiplexed functional area can display pictures normally when the camera is not in use.

However, it is necessary to define the through-hole on the touch control screen, which causes the touch control screen corresponding to the multiplexed functional area to be unable to achieve touch control function, thereby reducing flexibility of the touch control screen.

SUMMARY OF INVENTION

An embodiment of the present disclosure provides a touch control screen and an electronic device, which can improve flexibility of the touch control screen.

An embodiment of the present disclosure provides a touch control screen, which is applied to a display panel having a multiplexed functional area and includes:

a plurality of touch control units disposed at intervals, wherein, a material of the touch control units is a transparent conductive material; and a plurality of touch control lead wires corresponding to and connected to the touch control units, wherein, at least one of the touch control units covers at least a part of the multiplexed functional area.

An embodiment of the present disclosure further provides an electronic device, which includes:

the above touch control screen;

the display panel including the multiplexed functional area and disposed under the touch control screen; and an optical device disposed directly below the multiplexed functional area.

The touch control screen and the electronic device in the embodiments of the present disclosure are applied to the display panel having the multiplexed functional area and include: the plurality of touch control units disposed at intervals, wherein, the material of the touch control units is the transparent conductive material; and the plurality of touch control lead wires corresponding to and connected to the touch control units, wherein, at least one of the touch control units covers at least a part of the multiplexed functional area. Therefore, it is not necessary to define a through-hole on the touch control screen, thereby allowing the touch control screen corresponding to the multiplexed functional area to be able to achieve touch control function, and further improving flexibility of the touch control screen.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
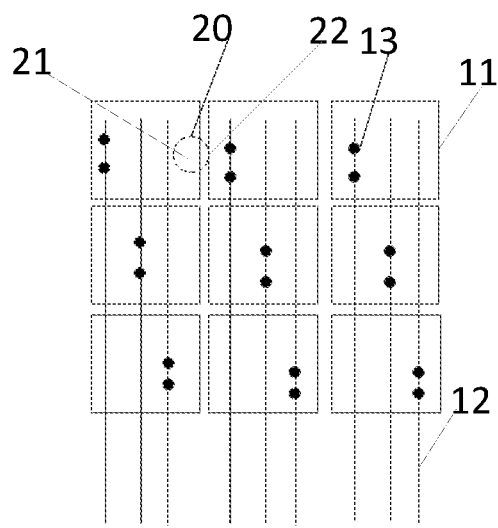
FIG. 1 is a schematic structural diagram of a touch control screen according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an inter-reaction between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

Referring to FIG. 1, FIG. 1 is a schematic structural diagram of a touch control screen according to an embodiment of the present disclosure.

As shown in FIG. 1, the touch control screen 10 in the embodiment is applied to a display panel having a multiplexed functional area 20. The touch control screen 10 includes a plurality of touch control units 11 disposed at intervals and a plurality of touch control lead wires 12.

Figure 2:
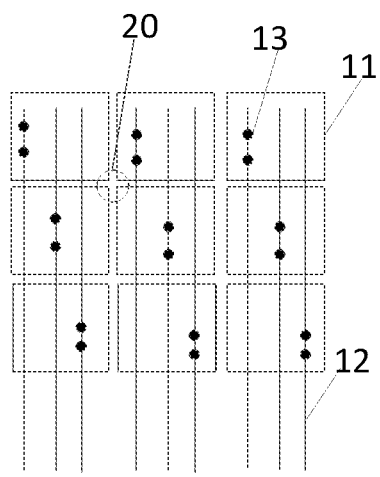
FIG. 2 is a schematic structural diagram of the touch control screen according to another embodiment of the present disclosure.
Figure 3:
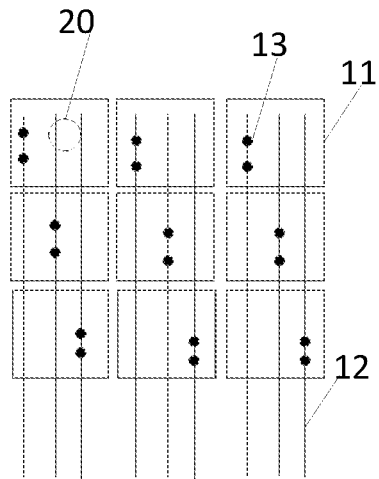
FIG. 3 is a schematic structural diagram of the touch control screen according to yet another embodiment of the present disclosure.

A material of the touch control units 11 is a transparent conductive material. In an embodiment, one of the touch control units 11 covers a part of the multiplexed functional area 20. In a preferred embodiment, in order to further improve light transmitting effect in the multiplexed functional area, the multiplexed functional area 20 includes a first sub-area 21 and a second sub-area 22, the one of the touch control units 11 covers the first sub-area 21, and a gap adjacent to the one of the touch control units 11 covers the second sub-area 22. For example, the touch control unit 11 of the first row and first column covers the first sub-area 21, and the gap adjacent to the touch control unit 11 covers the second sub-area 22. That is, the first sub-area 21 is the left area, and the second sub-area 22 is the right area. In other embodiments, as shown in FIG. 2, a plurality of the touch control units 11 adjacent to each other cover the part of the multiplexed functional area 20. For example, four of the touch control units 11 cover the part of the multiplexed functional area 20. Of course, two or more of the touch control units 11 may cover the part of the multiplexed functional area 20, and a number of the touch control units 11 covering thereon is not limited to this. In other embodiments, as shown in FIG. 3, one of the touch control units 11 may cover entire multiplexed functional area 20. That is, single touch control unit 11 covers entire multiplexed functional area 20. In an embodiment, the material of the touch control units 11 includes at least one of IZO, ITO, or IGZO. That is, the touch control units 11 may use a transparent conductive material having high transmittance, such as transmittance greater than or equal to 90%. In an embodiment, a shape of the touch control units 11 may be grid-like, which can reduce a contact area between the touch control units 11 and a cathode in the display panel, thereby reducing parasitic capacitance.

The touch control lead wires 12 correspond to the touch control units 11, and are connected to the touch control units 11 corresponding thereto. In an embodiment, the touch control lead wires 12 are connected to the touch control units 11 corresponding thereto by via holes 13, and a number of the via holes 13 may be single or plural. In order to improve accuracy of touch control, the touch control lead wires 12 correspond to the touch control units 11 by one-to-one. Of course, one touch control unit 11 may also correspond to a plurality of touch control lead wires 12, and a specific corresponding method is not limited to this. In an embodiment, the touch control lead wires 12 are arranged along a vertical direction. Of course, the touch control lead wires 12 may also be arranged along a horizontal direction. In a preferred embodiment, a material of the touch control lead wires 12 is a metal material having low resistivity, resistivity $\rho<3\mu\Omega*cm$. Under a top viewing angle, the touch control screen 10 of the embodiment does not have a through-hole.

Since the touch control units cover at least the part of the multiplexed functional area, the touch control screen covers the multiplexed functional area, that is, there is no through-hole defined on the touch control screen, thereby allowing the touch control screen corresponding to the multiplexed functional area to be able to achieve touch control function, and further improving flexibility of the touch control screen.

In an embodiment, in order to further improve the light transmitting effect in the multiplexed functional area, orthographic projections of the touch control lead wires 12 on the touch control screen 10 do not overlap an orthographic projection of the multiplexed functional area 20 on the touch control screen 10. That is, the touch control lead wires 12 are disposed outside of the multiplexed functional area 20, thereby preventing the multiplexed functional area 20 from being shielding.

In an embodiment, in order to simplify processes, the orthographic projections of the touch control lead wires 12 on the touch control screen 10 partially overlap orthographic projections of the touch control units 11 corresponding thereto on the touch control screen 10, and the touch control lead wires 12 corresponding to at least one of the touch control units 11 covering the multiplexed functional area 20 are disposed on one side or both sides of the multiplexed functional area 20. Combined with FIG. 1, for example, the touch control unit 11 of the first row and first column covers the first sub-area 21, and the touch control lead wires 12 corresponding to the touch control unit 11 are disposed on one side of the multiplexed functional area 20, such as the left side. Combined with FIG. 2, for example, the touch control units 11 of the first row and first column and the first row and second column both cover the part of the multiplexed functional area 20, the touch control lead wires 12 corresponding to the touch control unit 11 of the first row and first column are disposed on the left side of the multiplexed functional area 20, and the touch control lead wires 12 corresponding to the touch control unit 11 of the first row and second column are disposed on the right side of the multiplexed functional area 20.

Figure 4:
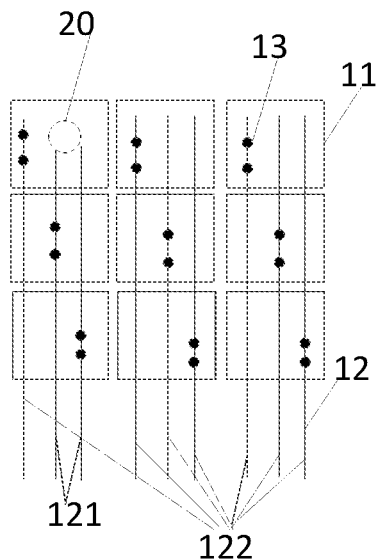
FIG. 4 is a schematic structural diagram of the touch control screen according to still yet another embodiment of the present disclosure.

In another embodiment, in order to further improve the light transmitting effect in the multiplexed functional area, as shown in FIG. 4, the touch control lead wires 12 include a plurality of set lead wires 121 and a plurality of non-set lead wires 122, extension lines of the set lead wires 121 overlap the multiplexed functional area 20, the non-set lead wires 122 do not overlap the multiplexed functional area 20, and a length of the set lead wires 121 is less than a length of the non-set lead wires 122. Of course, in other embodiments, the length of the set lead wires 121 may also be equal to the length of the non-set lead wires 122. In an embodiment, the material of the touch control lead wires 12 is the metal material or the transparent conductive material.

In another embodiment, the touch control lead wires 12 may be grid-like and have a plurality of opening areas (not shown in the figure). In other embodiments, a shape of the touch control lead wires 12 is strip-shaped, and it can be understood that the shape of the touch control lead wires 12 is not limited to this.

In another embodiment, returning to FIG. 3, the material of the touch control lead wires 12 is the transparent conductive material, and the orthographic projections of the touch control lead wires 12 on the touch control screen 10 partially overlap the orthographic projection of the multiplexed functional area 20 on the touch control screen 10. In other embodiments, as shown in FIGS. 1 to 3, lengths of each touch control lead wire 12 are same.

Figure 5:
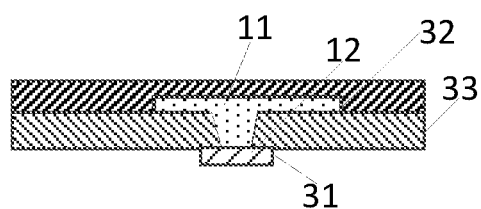
FIG. 5 is a schematic cross-sectional structural diagram of the touch control screen according to an embodiment of the present disclosure.

In an embodiment, as shown in FIG. 5, the touch control lead wires 12 are disposed in a first conductive layer 31, the touch control units 11 are disposed in a second conductive layer 32, a first insulating layer 33 is disposed between the second conductive layer 32 and the first conductive layer 31, and a thickness of the first insulating layer 33 is greater than a predetermined thickness. In an embodiment, the thickness of the first insulating layer 33 is greater than or equal to 1.5 um, and a material of the first insulating layer 33 may be an inorganic material or an organic material having a low temperature and a high dielectric constant, such as an organic photoresist. Since the thickness of the first insulating layer is set to be thicker, a distance to the cathode in the display panel can be increased, thereby reducing the parasitic capacitance and improving accuracy of touch control function.

Figure 6:
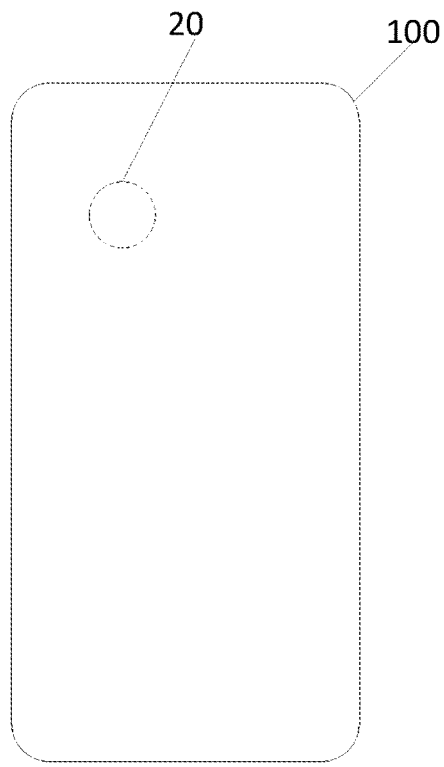
FIG. 6 is a top view of an electronic device according to an embodiment of the present disclosure.
Figure 7:
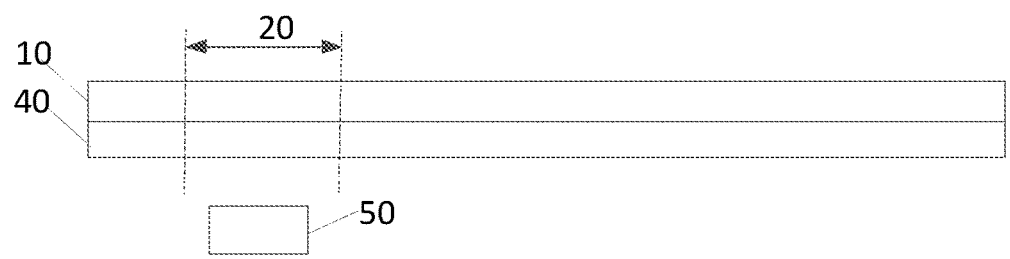
FIG. 7 is a schematic structural diagram of the electronic device according to an embodiment of the present disclosure.

Referring to FIGS. 6 and 7, FIG. 6 is a top view of an electronic device according to an embodiment of the present disclosure.

Combining FIG. 6 with FIG. 7, the electronic device 100 may include the above touch control screen 10, the display panel 40, and an optical device 50. The display panel 40 includes the multiplexed functional area 20, and is disposed under the touch control screen 10. The display panel 40 includes a plurality of sub-pixels (not shown in the figure).

The optical device 50 is disposed directly below the multiplexed functional area 20. The optical device 50 includes at least one of cameras, fingerprint recognition modules, or distance sensors. When the optical device 50 is working, the multiplexed functional area 20 is used to transmit external light to allow the optical device 50 to receive the light or to transmit light emitted by the optical device 50.

Under the top viewing angle, the touch control screen 10 of the embodiment does not have the through-hole.

In an embodiment, when the shape of the touch control lead wires 12 is grid-like, the touch control lead wires 12 have the plurality of opening areas, and positions of the opening areas correspond to the sub-pixels, thereby improving aperture ratio.

The electronic device provided in the embodiment of the present disclosure has same principles and technical effect as the embodiments of a display device mentioned above, and for brief description, for the parts not mentioned in the embodiment of the electronic device, please refer to the corresponding content in the embodiments of the foregoing display device.

The electronic device includes, but is not limited to, mobile phones, tablet computers, computer monitors, game consoles, televisions, display screens, wearable devices, vehicle display devices, other home devices or household appliances with display function, etc.

The touch control screen and the electronic device in the embodiments of the present disclosure are applied to the display panel having the multiplexed functional area and include: the plurality of touch control units disposed at intervals, wherein, the material of the touch control units is the transparent conductive material; and the plurality of touch control lead wires corresponding to and connected to the touch control units, wherein, at least one of the touch control units covers at least a part of the multiplexed functional area. Therefore, it is not necessary to define a through-hole on the touch control screen, thereby allowing the touch control screen corresponding to the multiplexed functional area to be able to achieve touch control function, and further improving flexibility of the touch control screen.

The touch control screen and the electronic device provided by the embodiment of the present disclosure are described in detail above. The specific examples are applied in the description to explain the principle and implementation of the disclosure. The description of the above embodiments is only for helping to understand the technical solution of the present disclosure and its core ideas. Meanwhile, for those skilled in the art, the range of specific implementation and application may be changed according to the ideas of the present disclosure. In summary, the content of the specification should not be construed as causing limitations to the present disclosure.

What is claimed is:

1. A touch control screen applied to a display panel having a multiplexed functional area and comprising:
   a plurality of touch control units disposed at intervals, wherein a material of the touch control units is a transparent conductive material; and
   a plurality of touch control lead wires corresponding to and connected to the touch control units, wherein at least one of the touch control units covers at least a part of the multiplexed functional area;
   wherein a material of the touch control lead wires is the transparent conductive material, and orthographic projections of the touch control lead wires on the touch control screen partially overlap an orthographic projection of the multiplexed functional area on the touch control screen.

2. The touch control screen according to claim 1, wherein the multiplexed functional area comprises a first sub-area and a second sub-area, the at least one of the touch control units covers the first sub-area, and a gap adjacent to the at least one of the touch control units covers the second sub-area.

3. The touch control screen according to claim 1, wherein a plurality of the touch control units adjacent to each other cover the part of the multiplexed functional area.

4. The touch control screen according to claim 1, wherein the at least one of the touch control units covers entire multiplexed functional area.

5. The touch control screen according to claim 1, wherein the orthographic projections of the touch control lead wires on the touch control screen partially overlap orthographic projections of the touch control units corresponding to the touch control lead wires on the touch control screen; and the touch control lead wires corresponding to the at least one of the touch control units covering the multiplexed functional area are disposed on one side or both sides of the multiplexed functional area.

6. The touch control screen according to claim 1, wherein the touch control lead wires comprise a plurality of set lead wires and a plurality of non-set lead wires, extension lines of the set lead wires overlap the multiplexed functional area, the non-set lead wires do not overlap the multiplexed functional area, and a length of the set lead wires is less than or equal to a length of the non-set lead wires.

7. The touch control screen according to claim 1, wherein a material of the touch control lead wires is a metal material or the transparent conductive material.

8. The touch control screen according to claim 1, wherein a shape of the touch control units is grid-like.

9. The touch control screen according to claim 1, wherein lengths of the touch control lead wires are same.

10. The touch control screen according to claim 1, wherein the touch control lead wires are disposed in a first conductive layer, the touch control units are disposed in a second conductive layer, a first insulating layer is disposed between the second conductive layer and the first conductive layer, and a thickness of the first insulating layer is greater than a predetermined thickness.

11. An electronic device, comprising:
a touch control screen;
a display panel comprising a multiplexed functional area and disposed under the touch control screen; and
an optical device disposed directly below the multiplexed functional area;
wherein the touch control screen is applied to the display panel having the multiplexed functional area and comprises:

a plurality of touch control units disposed at intervals, wherein a material of the touch control units is a transparent conductive material; and a plurality of touch control lead wires corresponding to and connected to the touch control units, wherein at least one of the touch control units covers at least a part of the multiplexed functional area;

wherein orthographic projections of the touch control lead wires on the touch control screen do not overlap an orthographic projection of the multiplexed functional area on the touch control screen;

wherein the touch control lead wires comprise a plurality of set lead wires and a plurality of non-set lead wires, extension lines of the set lead wires overlap the multiplexed functional area, the non-set lead wires do not overlap the multiplexed functional area, and a length of the set lead wires is less than or equal to a length of the non-set lead wires.

12. The electronic device according to claim 11, wherein the multiplexed functional area comprises a first sub-area and a second sub-area, the at least one of the touch control units covers the first sub-area, and a gap adjacent to the at least one of the touch control units covers the second sub-area.

13. The electronic device according to claim 11, wherein a plurality of the touch control units adjacent to each other cover the part of the multiplexed functional area.

14. The electronic device according to claim 11, wherein the at least one of the touch control units covers entire multiplexed functional area.

15. The electronic device according to claim 11, wherein the orthographic projections of the touch control lead wires on the touch control screen partially overlap orthographic projections of the touch control units corresponding to the touch control lead wires on the touch control screen; and the touch control lead wires corresponding to the at least one of the touch control units covering the multiplexed functional area are disposed on one side or both sides of the multiplexed functional area.

16. The electronic device according to claim 11, wherein the display panel comprises a plurality of sub-pixels, the touch control lead wires are grid-like and have a plurality of opening areas, and positions of the opening areas correspond to the sub-pixels.

* * * * *